United States Patent [19]

Ho

[11] Patent Number: 4,529,253
[45] Date of Patent: Jul. 16, 1985

[54] BICYCLE WHEEL, HUB AND SPOKE ASSEMBLY

[76] Inventor: Wei K. Ho, 99, Chiung Lin S. Rd., Hsinchuang, Taipei Hsien, Taiwan

[21] Appl. No.: 503,016

[22] Filed: Jun. 10, 1983

[51] Int. Cl.³ ............................ B60B 1/02; B60B 1/04
[52] U.S. Cl. ...................................... 301/57; 301/58; 301/59; 301/104; 301/105 B
[58] Field of Search ................................... 301/55–59, 301/73, 74, 79, 80, 104, 105 B

[56] References Cited

U.S. PATENT DOCUMENTS

| | | | |
|---|---|---|---|
| 543,311 | 7/1895 | Laube | 301/104 UX |
| 1,411,382 | 4/1922 | Rupe | 301/105 B X |
| 1,464,566 | 8/1923 | Ford | 301/105 B |
| 3,942,839 | 3/1976 | Chulk | 301/104 X |

FOREIGN PATENT DOCUMENTS

| | | | |
|---|---|---|---|
| 2303437 | 8/1973 | Fed. Rep. of Germany | 301/73 |
| 55-110602 | 8/1980 | Japan | 301/59 |

*Primary Examiner*—David A. Scherbel
*Attorney, Agent, or Firm*—Balogh, Osann, Kramer, Dvorak, Genova & Traub

[57] ABSTRACT

This is a new structure relating the wheel hub and spoke assembly, in which some portion of the spoke is bent, and the two hook-shaped bent ends of the spoke are to be hooked into the two adjacent rectangular holes on the wheel rim. The parallel elbow portions of the spoke are to be mounted inside the corresponding open slots on the wheel hub. The spokes are to be tightly pulled between the wheel hub and the wheel rim by means of the cylinder.

5 Claims, 7 Drawing Figures

BICYCLE WHEEL, HUB AND SPOKE ASSEMBLY

BACKGROUND OF THE INVENTION

Most of the conventional wheel hub structure are assembled together with a number of spokes thru the holes on the hub. Usually, one end of the conventional spoke is furnished with threads, and the other bent end is formed into a rivet head. The spokes are transposingly fixed on the both sides of the hub one after another. Since one end of the spoke to be fixed to the hub has to be a rivet head by hammering process, the quality of steel being used must be slighly soft; as a result, the strength of the spoke is relatively reduced, and the serviceable life of the spoke will also be reduced.

SUMMARY OF THE INVENTION

This invention relates to an improvement in accordance with the drawbacks of the conventional structure of the wheel hub and spoke assembly. The present invention not only can maintain the function of the conventional wheel hub and spoke assembly, but also can furnish with convenience in assembling work and with a precision design in the whole wheel assembly, i.e., the wheel assembly will enter into a new and ideal era.

The primary feature of the present invention is that the spoke made steel wire is directly bent into a shape similar to "S" to be installed between the wheel rim and the wheel hub; the spoke including two upper spokes and two lower spokes is equal to four conventional spokes with rivet head; therefore, the present invention can save a lot of assembling time and manpower as well as can increase the strength of the whole wheel structure.

Another feature of the present invention is that, on the circumference of the wheel hub, an even number of open slots are furnished so as to have the parallel elbow portions of the spoke directly caught inside the two open slots opposite the spoke, and to simplify the assembling time, and manpower for the whole wheel. Upon the spokes being assembled in place, a cylinder is inserted thru the two wheel hubs to make them separated each other; then, the spokes will tightly be attached to the wheel hub without being loosened out of the open slots.

A further feature of the present invention is that the end of the spoke is formed into a bent end so as to hook into the rectangular hole of the wheel rim before the spoke being pulled in a tension state; this is an important improvement to the conventional spoke, of which the spoke end has to be furnished with threads so as to be fixedly attached to the wheel rim with a nut.

DETAILED DESCRIPTION

Figure 1:
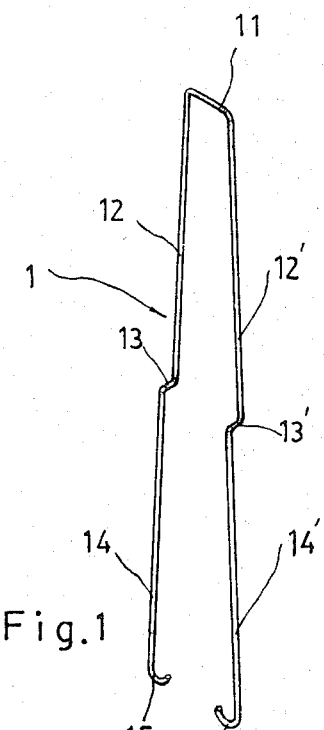
FIG. 1 is the perspective view of the spoke in the present invention.

Referring to FIG. 1, there is shown the spoke being made of super-hardened steel wire and bent into a shape similar to "S" so as to replace the four conventional spokes with bent rivet heads. The spoke 1 comprises the connecting portion 11, the upper spokes 12 and 12', the elbow portions 13 and 13', the lower spokes 14 and 14', and the hook-shaped bent ends 15 and 15'. Upon being assembled on the wheel, the two upper spokes 12 and 12' and the two lower spokes 14 and 14' may be used to replace the four conventional spokes. The arc length of the connecting portion 11 of the spoke 1 is exactly equal to the arc length (referring to FIGS. 2 and 3) between the two adjacent rectangular holes 21 on the wheel rim 2 so as to have the connecting portion 11 closely mounted between the two rectangular holes 21 and in the groove of the wheel rim 2.

In the present invention, the two ends of the spoke 1 are formed into hook-shaped bent ends 15 and 15' so as to hook into the rectangular holes 21 on the wheel rim 2; therefore, the spoke designed in the present invention has improved the drawbacks of the conventional spoke that has to be furnished with threads at its end and to be fixed on the wheel rim with a nut.

Figure 2:
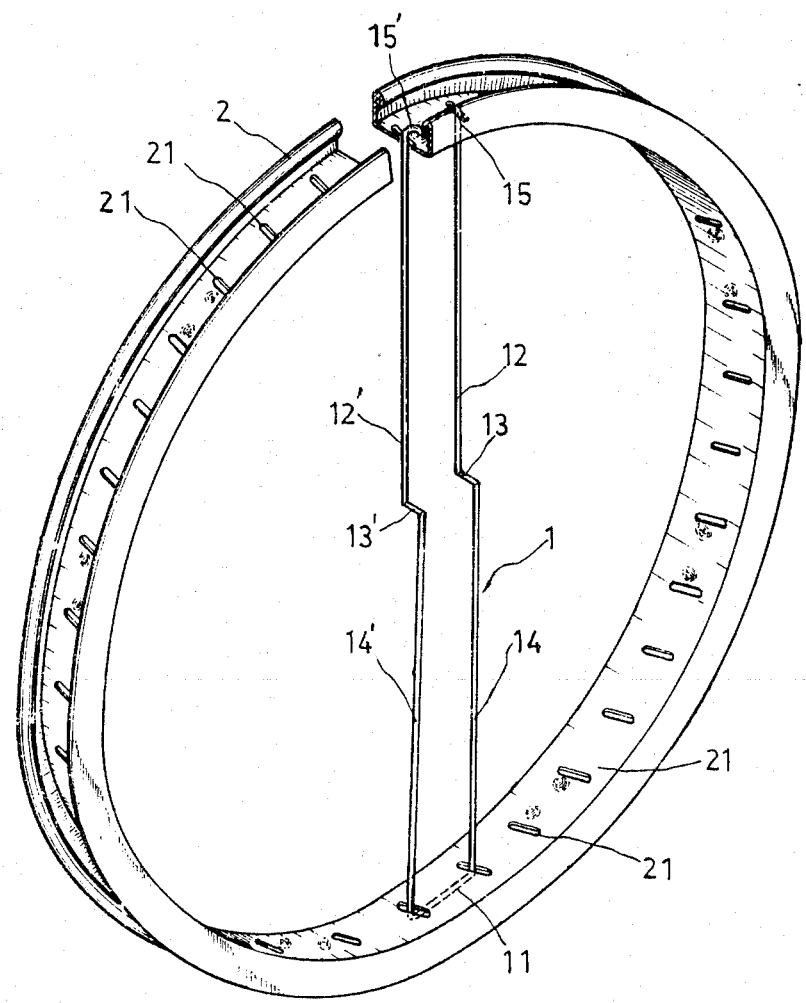
FIG. 2 is the perspective view of a spoke being assembled to the wheel rim of the present invention.

Referring to FIG. 2, there is shown the perspective view of the spoke in the present invention being mounted on the wheel rim 2. When assembling, the hook-shaped bent ends 15 and 15' of the spoke 1 are first put thru the two adjacent rectangular holes 21 on the wheel rim 2 (see FIG. 3), and then pass thru the corresponding and opposite rectangular holes 21 on the wheel rim 2, being hooked in those holes. In that case, the wheel hub 3 (shown in FIG. 3) has not been assembled to have the spokes pulled axially; therefore, the spoke 1 may be slightly bent to let the hook-shaped bent ends 15 and 15' pass thru the rectangular holes 21 and hook thereto.

Figure 3:
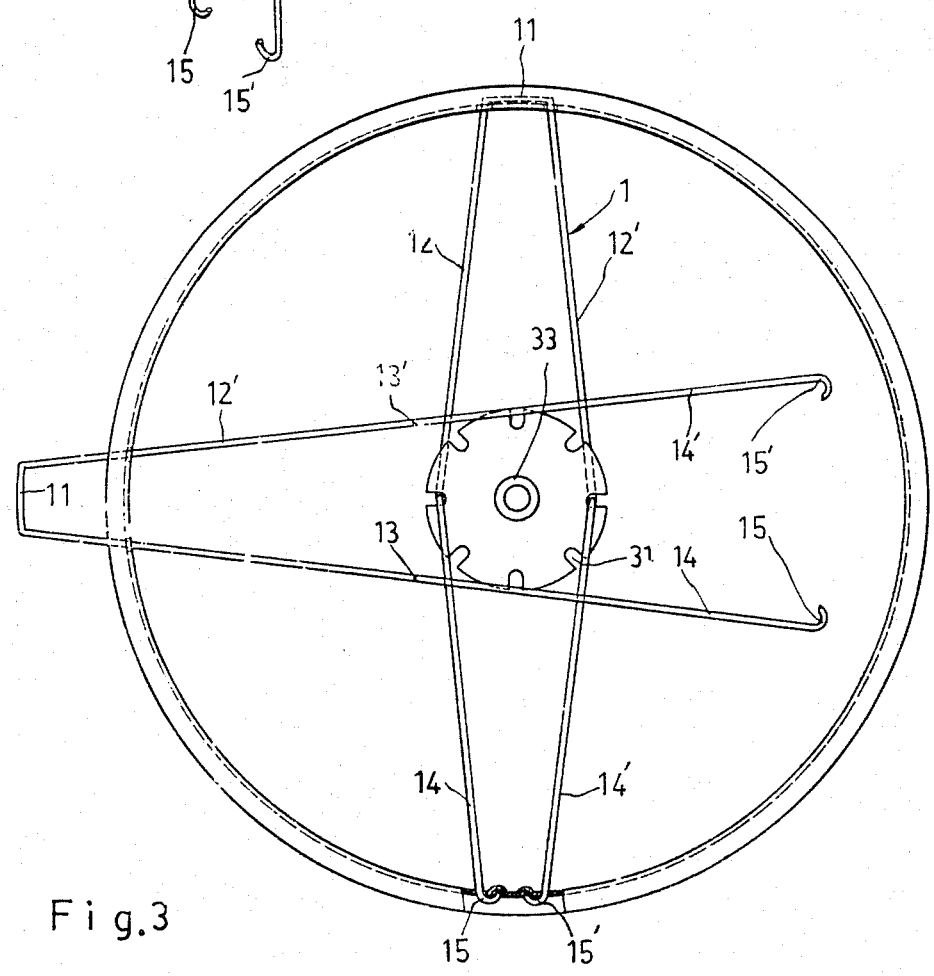
FIG. 3 is a front view showing the spoke having been mounted between the wheel hub and the wheel rim in the present invention.

Referring to FIG. 3, there are shown an even number of open slots 31 being furnished along the circumference of the wheel hub 3 at an identical arc length. Upon the spokes mounted on the wheel rim 2 being pulled axially, the parallel elbow portions 13 and 13' will directly be inserted into the corresponding open slots 31 on the wheel hub 3. This will improve the drawbacks of wasting a lot of manpower in assembling the conventional spoke and the spoke in the prior application case, in which the spoke has to put thru the steel wire hole on the hub; further, the number of the open slots 31 to be furnished on the hub may be reduced to a half number of the steel wire holes to be furnished on a conventional wheel hub.

Figure 4:
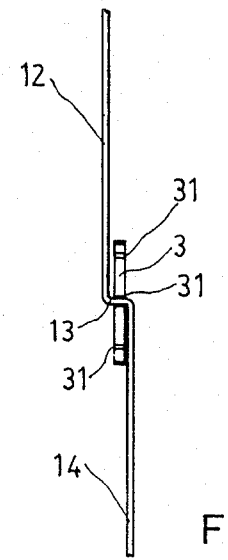
FIG. 4 is a side view of the spoke being mounted on the wheel hub in the present invention.

Referring to FIG. 4, there is shown the elbow portion 13 of the spoke 1 being inserted into the open slot 31 of the wheel hub 3; now, both the upper spoke 12 and the lower spoke 14 extend outwards respectively along the two sides of the wheel hub 3. As shown in FIG. 4, the lower spoke 14 closely contacts with the outer surface of the wheel hub 3, while the upper spoke 12 is placed in position having a narrow space with the inner surface of the wheel hub 3.

Figure 5:
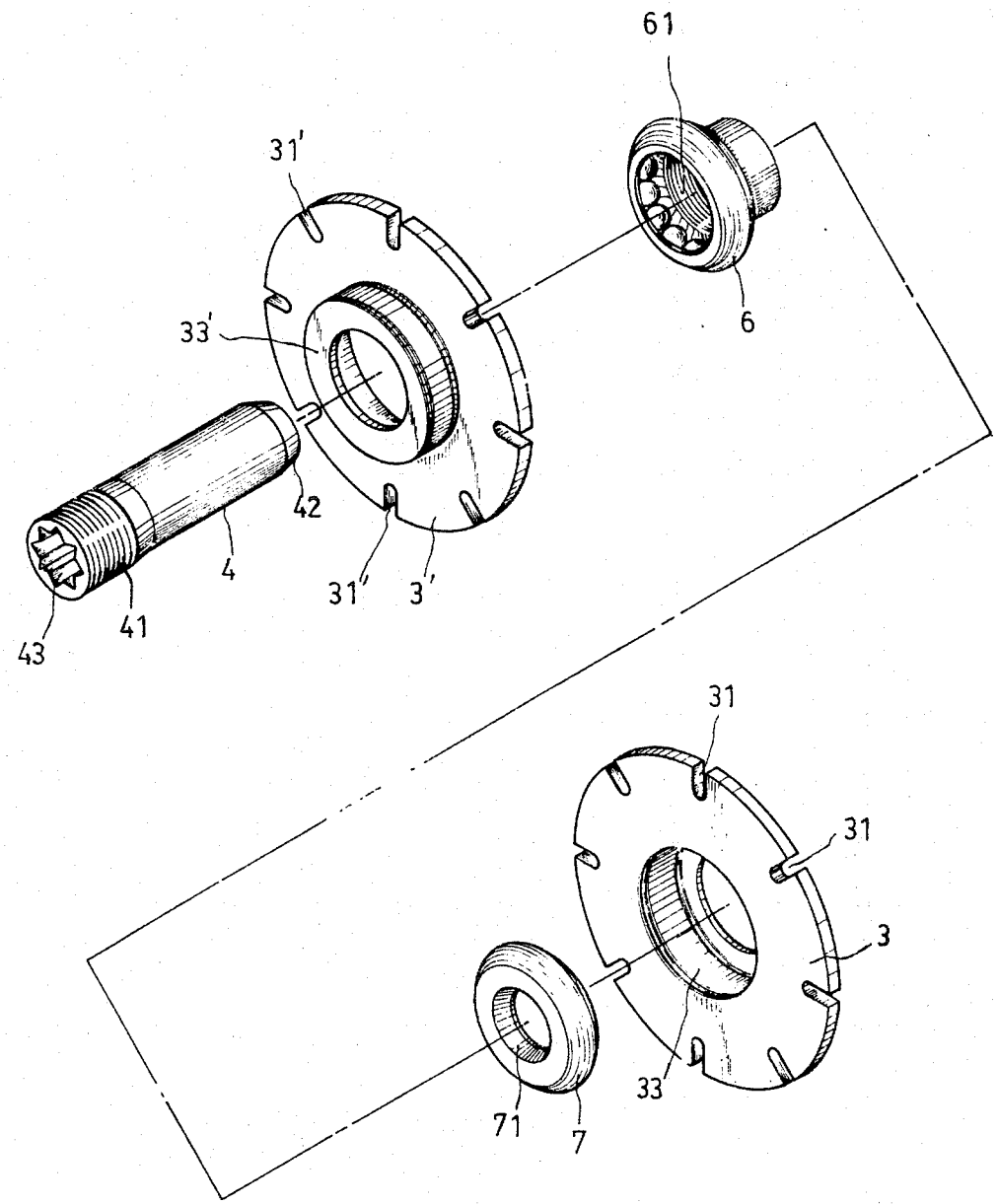
FIG. 5 is the exploded view of the axle in the present invention.

FIG. 5 is an exploded view of the axle assembly of the present invention; it is a detachable axle assembly, and may also be adjustable to the space between the two wheel hubs. That axle assembly comprises a cylinder 4, two wheel hubs 3 and 3', a front bearing block 6 and a rear bearing block 7. On the wheel hubs 3 and 3', a number of open slots 31 and 31' are furnished for inserting the elbow portions 13 of the spoke.

Referring again to FIG. 5, there is shown a cylinder 4, of which the head portion 41 (having larger outer diameter than that of the cylinder body portion) is furnished with threads, and the tail portion 42 is in a conic shape.

Inside the front bearing block 6, a number of inner threads 61 are furnished; the whole front bearing block 6 may be placed into the ring-shaped flange 33' of the wheel hub 3'.

The rear bearing block 7 is provided with a conic hole 71, and the whole block may be placed into the ring-shaped flange 33 of the wheel hub 3.

Figure 6:
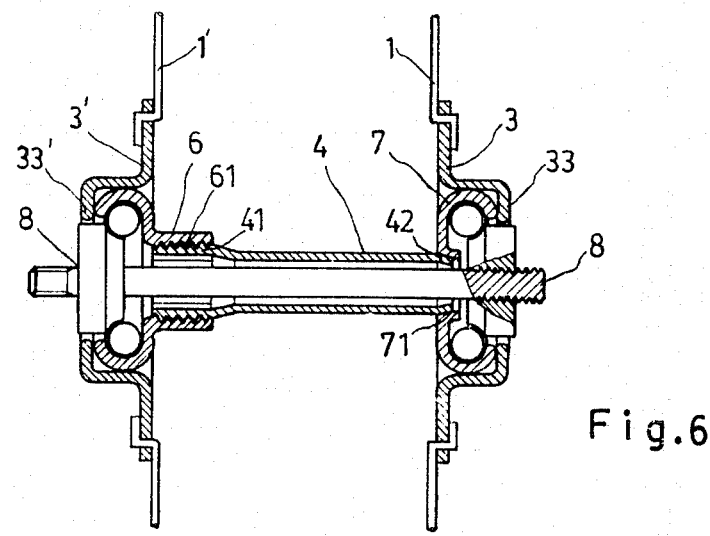
FIG. 6 is a sectional view of the axle assembly of the present invention.

Referring to FIG. 6, there is shown a sectional view of the axle assembly; when assembling it, first the spokes 1 are mounted on the wheel rim 2, the wheel hub 3 and 3'; then, put the tail portion 42 of cylinder 4, thru the wheel hub 3' and the front bearing block 6, into and tightly against the rear bearing block 7; then, let the threads on the head portion 41 of the cylinder 4 engage together with the inner threads 61 of the front bearing block 6. Since the rear bearing block 7 is placed inside the flange 33 of the wheel hub 3, and the front bearing block 6 is placed inside the flange 33' of the wheel hub 3', the space between the two wheel hubs 3 and 3' will be increased upon the cylinder 4 being screwed tightly so as to have the spokes pulled outwards tightly.

The polygen wrench hole 43 in the cylinder 4 as shown in FIG. 5 is used for turning said cylinder with a polygon wrench.

Referring to FIG. 6, there is shown an axle 8, which may be put inside the cylinder 4 after the whole wheel assembly being assembled. On the thread portion at the both ends of said axle 8, the vehicle frame may be mounted.

Figure 7:
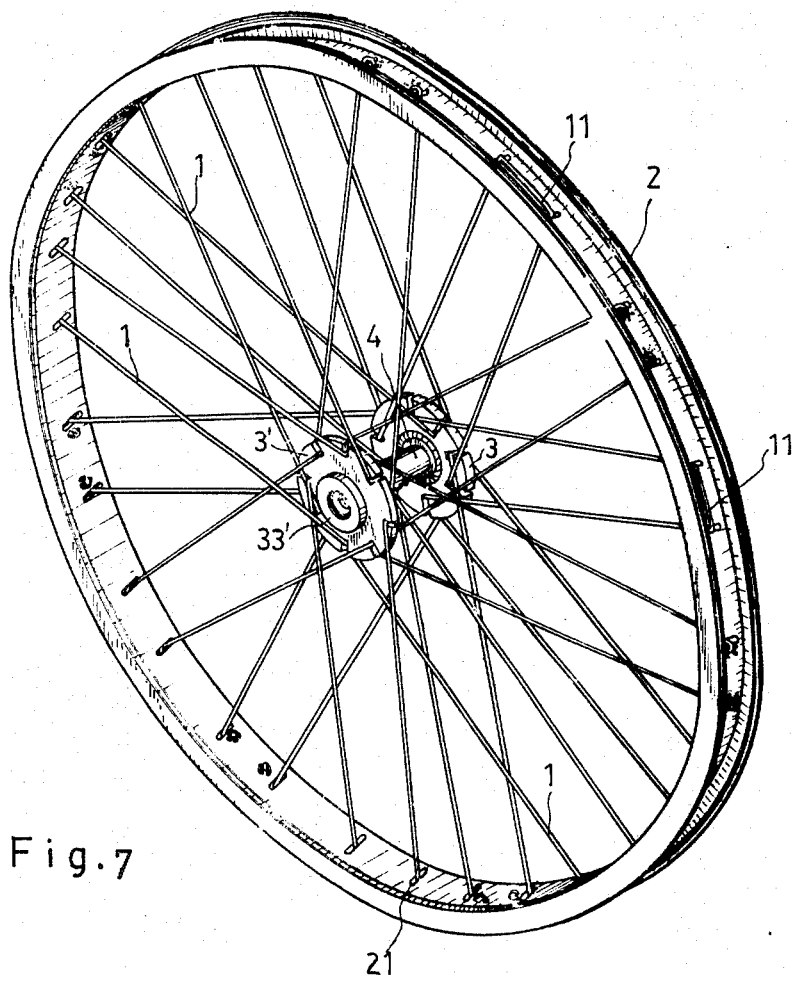
FIG. 7 is a perspective view of the present invention.

Referring to FIG. 7, there is shown a perspective view of the whole wheel embodiment of the present invention.

I claim:

1. A wheel hub and spoke assembly comprising a wheel rim provided with a plurality of spaced elongated slots aligned transversely along a width of said rim, a plurality of spoke members engageable with said rim, each spoke member having a connecting portion, a pair of spokes extending from said connecting portion and terminating in bent ends, each spoke having an upper portion connected to said connecting portion, a deformed portion, and a distal portion terminating in one of said bent ends, a hub having a pair of symmetrical hub members, each hub member being provided with a number of slots adapted to receive the deformed portions of said spokes, each hub member having a ring-shaped flange for receiving a bearing block and means on said bearing blocks for receiving a hollow cylinder and adjustably spacing said hub members apart, whereby the spokes of each spoke member are adapted to pass through a pair of adjacent slots and extend diametrically across the wheel rim to engage a pair of adjacent slots with the respective bent ends, while the deformed portions of said spokes are adapted to engage two pairs of slots in one of said hub members.

2. A wheel hub and spoke assembly as claimed in claim 1, wherein an arc length of the connecting portion of said spoke member is equal to an arc length between the two adjacent elongated holes on said wheel rim whereby when said spoke members are mounted on the said wheel rim, said connecting portion will closely and tightly be positioned between said two adjacent elongated holes in a groove of said wheel rim.

3. A wheel hub and spoke assembly as claimed in claim 1, wherein each hub member is furnished, on its circumference, with an even number of open slots having an equal arc length.

4. A wheel hub and spoke assembly according to claim 1, wherein said bearing blocks comprise a rear bearing provided with a conic hole and mountable inside said hub, and a front bearing block provided with inner threads and mountable inside said hub, said hollow cylinder having one end formed into a cone adapted to engage the conic hole of said rear bearing block, and the other end being provided with threads to engage with said inner threads of said front bearing block.

5. A wheel hub and spoke assembly according to claim 4, wherein an outer end of said cylinder is provided with a socket adapted to receive a torque force for spreading said hub members to apply proper tension to all of said spoke members.

* * * * *